(12) United States Patent
Gao et al.

(10) Patent No.: US 9,959,487 B2
(45) Date of Patent: May 1, 2018

(54) METHOD AND DEVICE FOR ADDING FONT

(71) Applicant: Xiaomi Inc., Beijing (CN)

(72) Inventors: Yi Gao, Beijing (CN); Hongqiang Wang, Beijing (CN); Yunyuan Ge, Beijing (CN)

(73) Assignee: Xiaomi Inc., Beijing (CN)

( * ) Notice: Subject to any disclaimer, the term of this patent is extended or adjusted under 35 U.S.C. 154(b) by 9 days.

(21) Appl. No.: 15/162,818

(22) Filed: May 24, 2016

(65) Prior Publication Data

US 2017/0140254 A1    May 18, 2017

(30) Foreign Application Priority Data

Nov. 13, 2015  (CN) .......................... 2015 1 0777990

(51) Int. Cl.
*G06F 17/20* (2006.01)
*G06K 9/68* (2006.01)
*G06F 17/21* (2006.01)
*G06F 17/30* (2006.01)
*G06K 9/22* (2006.01)

(Continued)

(52) U.S. Cl.
CPC ......... *G06K 9/6828* (2013.01); *G06F 17/214* (2013.01); *G06F 17/30312* (2013.01); *G06F 17/30377* (2013.01); *G06K 9/22* (2013.01); *G06K 9/344* (2013.01); *G06K 9/348* (2013.01); *H04M 1/72552* (2013.01)

(58) Field of Classification Search
CPC .. G06F 17/214; G06F 17/24; G06F 17/30905; G06F 17/211; G06F 17/212; G06F 17/30312; G06F 17/30377; G06K 9/6828; G06K 9/22; G06K 9/344; G06K 9/348; H04M 1/72552
USPC .......................................... 715/269
See application file for complete search history.

(56) References Cited

U.S. PATENT DOCUMENTS 8,576,233 B2 * 11/2013 Miyazawa ............ G06F 17/214
                                                345/467
2004/0001606 A1 * 1/2004 Levy ..................... G06T 1/0021
                                                382/100

(Continued)

FOREIGN PATENT DOCUMENTS

CN         101833936 A         9/2010
CN         102053949 A         5/2011

(Continued)

OTHER PUBLICATIONS

International Search Report of PCT/CN2015/099722, mailed from the State Intellectual Property Office of China dated Aug. 17, 2016.

(Continued)

*Primary Examiner* — Scott T Baderman
*Assistant Examiner* — Hassan Mrabi
(74) *Attorney, Agent, or Firm* — Finnegan, Henderson, Farabow, Garrett & Dunner LLP

(57) ABSTRACT

The present disclosure provides a method and a device for adding a font. The method includes: acquiring an image; recognizing text in the image as at least one character, each character being a font file corresponding to a single word or a single symbol; and adding a recognized character to a system font library, the system font library including characters used for displaying text on a user interface.

12 Claims, 12 Drawing Sheets

(51) Int. Cl.
*G06K 9/34* (2006.01)
*H04M 1/725* (2006.01)

(56) References Cited

U.S. PATENT DOCUMENTS

| | | | | |
|---|---|---|---|---|
| 2006/0072162 | A1* | 4/2006 | Nakamura | H04L 51/06 358/402 |
| 2008/0120541 | A1* | 5/2008 | Cheng | G06F 17/2217 715/269 |
| 2011/0157611 | A1 | 6/2011 | Rimai et al. | |
| 2012/0001922 | A1 | 1/2012 | Escher et al. | |
| 2012/0288190 | A1* | 11/2012 | Tang | G06K 9/00 382/165 |
| 2015/0332491 | A1* | 11/2015 | Dwivedi | G06T 11/60 345/636 |

FOREIGN PATENT DOCUMENTS

| | | |
|---|---|---|
| CN | 102289322 A | 12/2011 |
| CN | 102930575 A | 2/2013 |
| CN | 103136769 A | 6/2013 |
| CN | 103488711 A | 1/2014 |
| CN | 104715497 A | 6/2015 |
| JP | 63-85593 A | 4/1988 |
| KR | 10-2009-0092210 A | 8/2009 |
| KR | 10-2013-0066603 A | 8/2013 |
| RU | 2394268 C2 | 7/2010 |

OTHER PUBLICATIONS

Extended European Search Report for European Application No. 16165194.8, from the European Patent Office, dated Apr. 6, 2017.
English version of International Search Report of PCT/CN2015/099722, mailed from the State Intellectual Property Office of China dated Aug. 17, 2016.
Office Action for Russian Patent Application. 2016111908/08(018718), from the Russian Federal Service for Intellectual Property, dated Jun. 26, 2017.
Lin Jeng-Wei et al: "Font generation of personal handwritten Chinese characters", Optomechatronic Micro/Nano Devices and Components III: Oct. 8-10, 2007, Lausanne, Switzerland; [Proceedings of SPIE, ISSN 0277-786X], SPIE, Bellingham, Wash, vol. 9069, Jan. 10, 2014 (Jan. 10, 2014), pp. 90691T-90691T, XP060032678. DOI : 10.1117/12.2050128, ISBN: 978-1-62841-730-2.
Jeng-Wei Lin et al: "FontCloud: Web Font Service for Personal Handwritten, Ancient, and Unencoded Characters." In: "Lecture Notes in Electrical Engineering". Jan. 29, 2015 (Jan. 29, 2015), Springer, Germany. XP55360091, ISSN: 1876-1100, ISBN: 978-3-642-05166-1, vol. 329. pp. 113-119. DOI: 10.1007/978-94-017-9558-6_14.
Junsong Zhang et al: "Outline Font Generating from Images of Ancient Chinese Calligraphy", Nov. 1, 2010 (Nov. 1, 2010), Transactions on Edutainment V, Springer Berlin Heidelberg, Berlin, Heidelberg, pp. 122-131, XP019160144, ISBN: 978-3-642-18451-2.

* cited by examiner

METHOD AND DEVICE FOR ADDING FONT

CROSS-REFERENCE TO RELATED APPLICATIONS

The present application is based upon and claims priority to Chinese Patent Application No. 201510777990.4, filed Nov. 13, 2015, the entire contents of which are incorporated herein by reference.

TECHNICAL FIELD

The present disclosure generally relates to the technical field of mobile terminals and, more particularly, to a method and a device for adding a font.

BACKGROUND

A mobile terminal, such as a smart phone, a tablet computer, etc., is typically pre-installed with a default system font library. The system font library is used for displaying text on a user interface of the mobile terminal. Conventionally, to modify the system font library, the user needs to download a second font library and set the second font library as the default system font library. This will change the font of all the texts displayed on the user interface.

SUMMARY

According to a first aspect of the present disclosure, there is provided a method for use in a terminal, comprising: acquiring an image; recognizing text in the image as at least one character, each character being a font file corresponding to a single word or a single symbol; and adding a recognized character to a system font library, the system font library including characters used for displaying text on a user interface.

According to a second aspect of the present disclosure, there is provided a device for adding a font, comprising: a processor; and a memory for storing instructions executable by the processor; wherein the processor is configured to perform: acquiring an image; recognizing text in the image as at least one character, each character being a font file corresponding to a single word or a single symbol; and adding a recognized character to a system font library, the system font library including characters used for displaying text on a user interface.

According to a third aspect of the present disclosure, there is provided a non-transitory computer-readable storage medium storing instructions that, when executed by a processor of a device, cause the device to perform a method for adding a font, the method comprising: acquiring an image; recognizing text in the image as at least one character, each character being a font file corresponding to a single word or a single symbol; and adding a recognized character to a system font library, the system font library including characters used for displaying text on a user interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the invention as recited in the appended claims.

Figure 1:
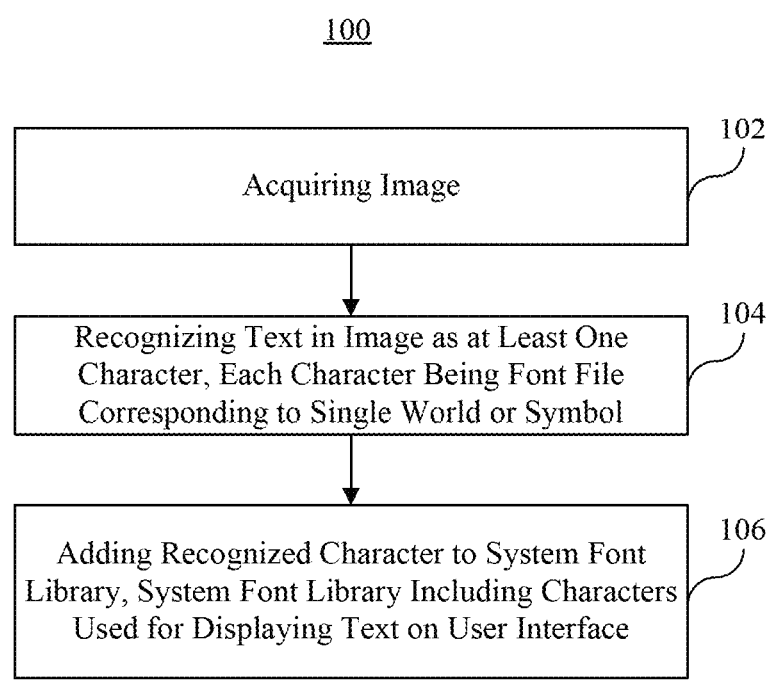
FIG. 1 is a flowchart of a method for adding a font, according to an exemplary embodiment.

FIG. 1 is a flowchart of a method 100 for adding a font, according to an exemplary embodiment. For example, the method 100 may be applied in a terminal with an image processing function. As shown in FIG. 1, the method 100 may include the following steps.

In step 102, the terminal acquires an image.

The image acquired by the terminal may contain text displayed in a font, which a user intends to use in the future.

In exemplary embodiments, the user may use the terminal to shoot the image with the photographing function of the terminal, or save the image directly from a page that the user has browsed.

In step 104, the terminal recognizes the text in the image as at least one character. A character is a font file corresponding to a single word or symbol. In the following description, "character" and "font" will be used interchangeably.

The text in the image may include one or more words or symbols, and the terminal may recognize each word or symbol in the image as a corresponding character. A character is a font file corresponding to a single word or symbol. A font file is a file used by the terminal for displaying a word or symbol according to a font size. The font in a font file is defined by a particular mathematical model. The font file can be freely zoomed in or out, or freely rotated.

In exemplary embodiments, a character may be a word or symbol in a standard font different from the default fonts used by the terminal. Alternatively, the character may be in a handwriting font, such as a calligraphy font or a scrawl font.

In step 106, the terminal adds a recognized character into a system font library of the terminal. The system font library includes the characters (i.e., fonts) used by the terminal for displaying text on a user interface of the terminal.

The terminal displays text on the user interface according to the system font library. The system font library stores characters in standard fonts that are treated as default by the terminal. The system font library may also store characters in personalized fonts that are added by the user at any time.

According to the method 100, the terminal first acquires an image containing text. The terminal then recognizes the text in the image as at least one character. The terminal may further add a recognized character into the system font library. The method 100 simplifies the operation of modifying a font and solves the problem that the displayed font can only be modified by manually downloading a new font library. For example, to modify a font, the user only needs to photograph a word or a symbol that the user likes to use. Moreover, the method 100 only modifies the font corresponding to the recognized characters, thereby avoiding modifying the fonts of all the characters used by the terminal.

Figure 2A:
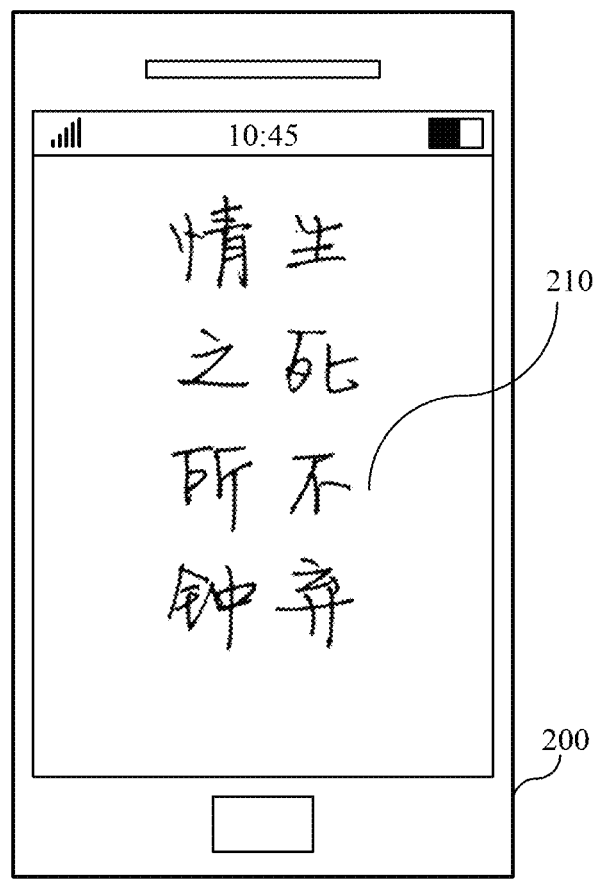
FIG. 2A is a schematic diagram illustrating an implementation of a method for adding a font, according to an exemplary embodiment.
Figure 2B:
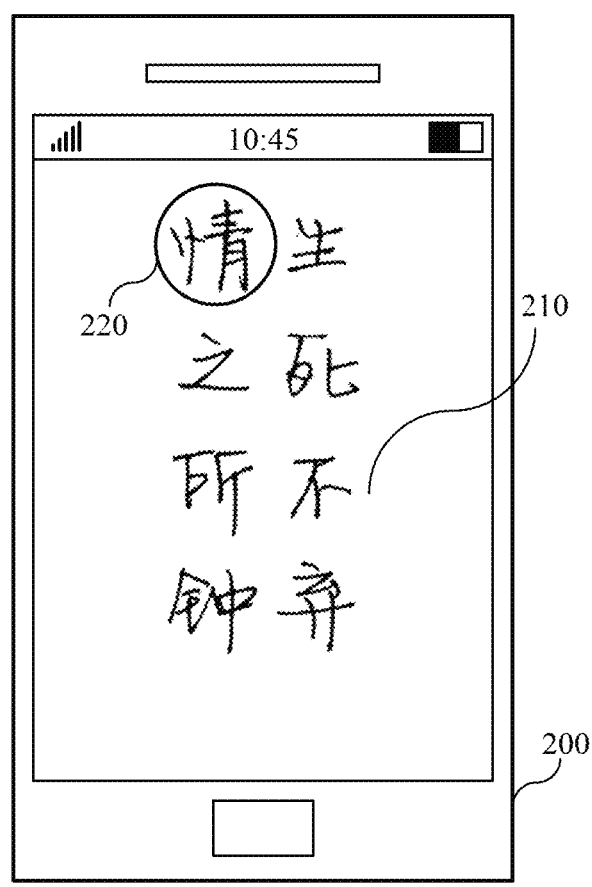
FIG. 2B is a schematic diagram illustrating an implementation of a method for adding a font, according to an exemplary embodiment.
Figure 2C:
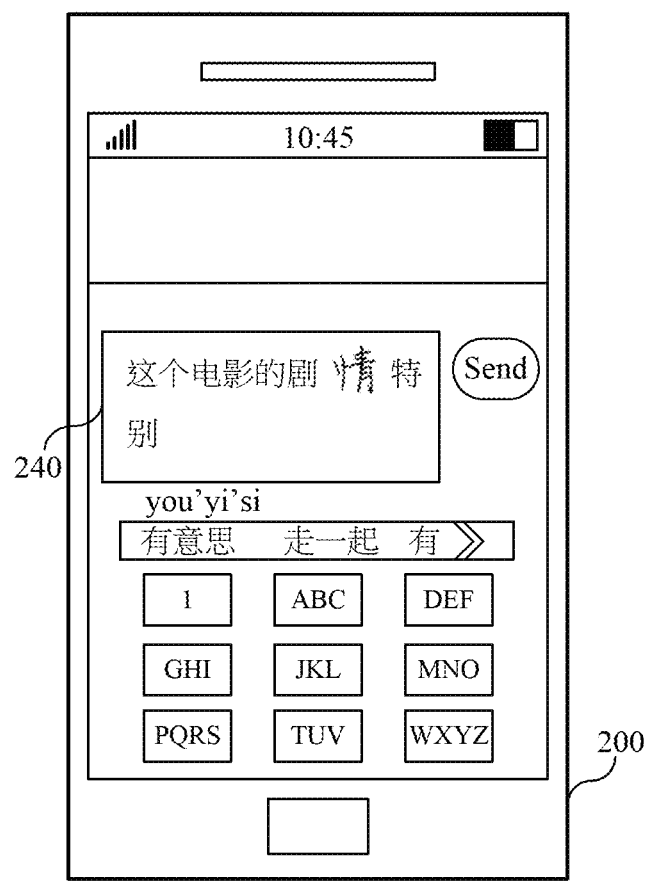
FIG. 2C is a schematic diagram illustrating an implementation of a method for adding a font, according to an exemplary embodiment.

FIGS. 2A-2C are schematic diagrams illustrating an implementation of the method 100 (FIG. 1), according to an exemplary embodiment. For example, the terminal in the method 100 may be a smart phone. The smart phone is capable of acquiring an image containing text. In the illustrated embodiment, it is assumed that the text is in Chinese. As shown in FIG. 2A, a user of a smart phone 200 sees a sentence in a friend's notebook, and is interested in some of the text in the sentence. Therefore, the user uses the smart phone 200 to acquire an image 210 of the sentence. The user is interested in the Chinese word, "情" in the image 210, and wants to add it to the system font library of the smart phone 200. As shown in FIG. 2B, the image 210 is displayed on the user interface of the smart phone 200, and the user selects, on the image, a region 220 that encompasses the word "情." The smart phone 200 recognizes the text, including the word "情," in the selected region 220. After the word "情" is recognized, the smart phone 200 generates a corresponding character "情," and adds the character "情" to the system font library. As shown in FIG. 2C, in subsequent operations, when a text including the word "情" needs to be displayed on the user interface, such as displayed in a text input box 240, the smart phone 200 displays the word "情" according to the newly added character "情."

Figure 3A:
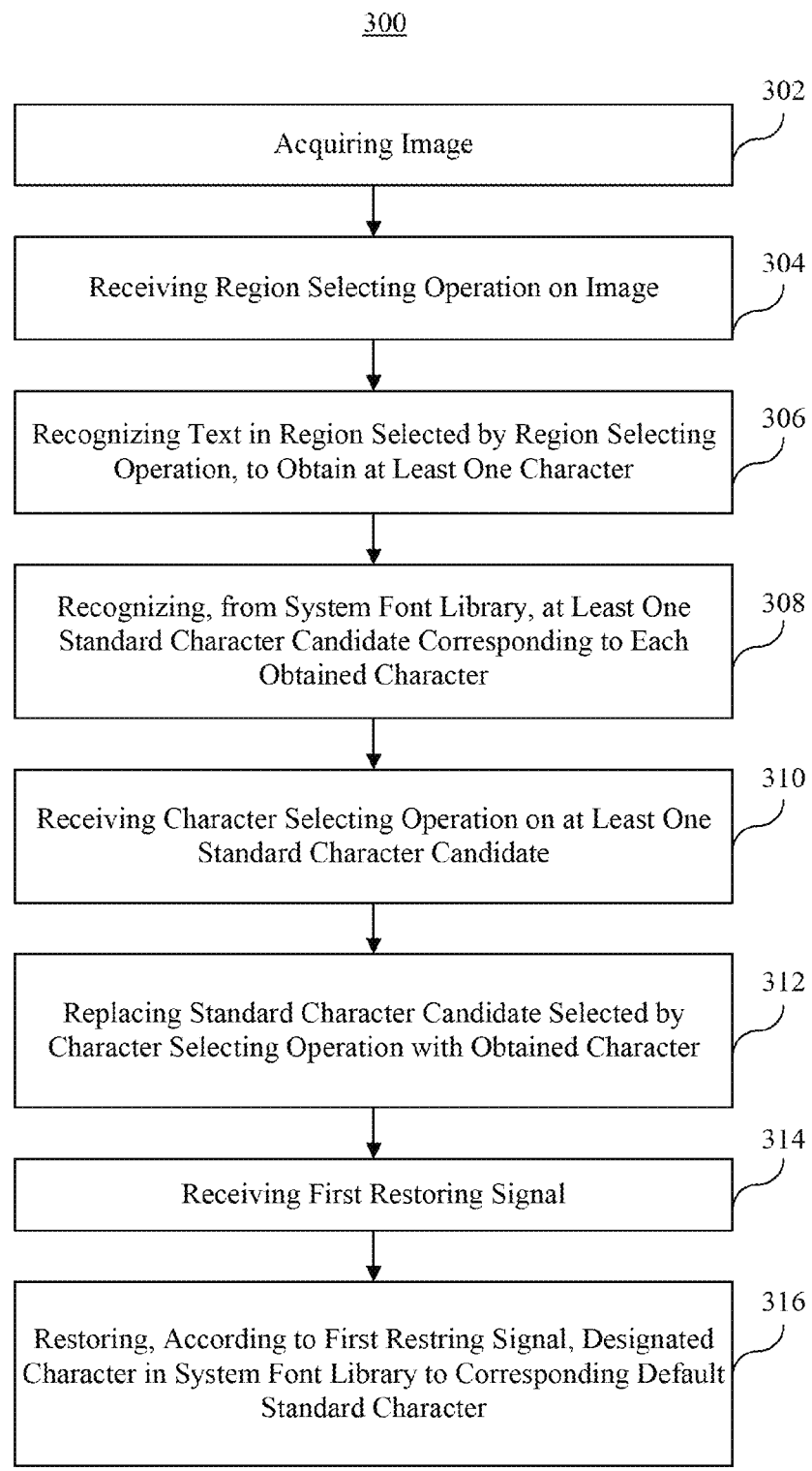
FIG. 3A is a flowchart of a method for adding a font, according to an exemplary embodiment.

FIG. 3 is a flowchart of a method 300 for adding a font, according to an exemplary embodiment. For example, the method 300 may be applied in a terminal with an image processing function. As shown in FIG. 3, the method 300 may include the following steps.

In step 302, the terminal acquires an image.

In exemplary embodiments, the terminal may acquire the image in various manners. The terminal may be a smart device with a photographing function, such as a smart phone or a tablet computer. A user can use the photographing function to shoot an image containing text. Alternatively, the terminal may be capable of saving an image from a page that user has browsed. When the user gets interested in the words or symbols in a browsed page, the user may save an image of the page in the terminal.

For example, when the user travels at a scenic spot and gets attracted by a beautifully written text displayed at the entrance of the scenic spot, the user can use the terminal to capture an image of the text. For another example, when the user uses social networking software installed in the terminal to chat with a friend, the user may find that the font of the text on a picture sent by the friend is attractive. The user may save the picture directly in the terminal.

In step 304, the terminal receives a region selecting operation on the image.

The user saves the acquired image in the terminal. The user may then perform a selecting operation on the text in the image.

In exemplary embodiments, the user may retrieve the acquired image through font setting options of the terminal. After the image is retrieved, the user may perform a region selection operation on the text in the image. The terminal then receives the region selecting operation.

The region selecting operation may be performed in various manners. For example, the user may draw a circle around a region containing text. For another example, the user may use a touch pen to select the region.

In step 306, the terminal recognizes the text in a region selected by the region selecting operation, to obtain at least one character.

In exemplary embodiments, the terminal may use any method known in the art to recognize the text in the image as character. In one method, if the image containing the text is colorful, the terminal transforms the part of the colorful image within the selected region to a grayscale image. The terminal then performs edge detection on the grayscale image, to obtain a binary edge image. The terminal divides the binary edge image into multiple row regions, and recognizes, from each row region, multiple rectangular regions containing text. The terminal then generates one or more characters based on the text in each rectangular region.

In step 308, the terminal recognizes, from the system font library, at least one standard character candidate corresponding to each obtained character.

The terminal further recognizes, based on the standard characters in the system font library, each character obtained from the rectangular regions. For each obtained character, the terminal may recognize, from the system font library, at least one standard character candidate for the user to select.

For example, the standard character candidates corresponding to the character "情" may include: "倩," "情," "请," "睛," and "晴."

In some embodiments, if none of the standard character candidates automatically recognized by the terminal is correct, the terminal may also allow the user to manually input a standard character candidate.

In step 310, the terminal receives a character selecting operation on the at least one standard character candidate.

When the terminal obtains more than one character from the region selected by the user, the terminal recognizes each obtained character, one by one, by allowing the user to perform a character selecting operation on the provided standard character candidates, until all the characters obtained from the selected region are recognized and obtained. That is, when multiple characters are obtained from the selected region of the image, the terminal performs steps 306-310 for each obtained character, until a unique standard character is determined for each obtained character.

In step 312, the terminal replaces, in the system font library, the standard character candidate selected by the character selecting operation with the corresponding obtained character.

As described above, a character is a font file corresponding to a single word or a symbol. Each obtained character has a font different from the default standard character in the system font library. The terminal uses each newly obtained character to replace the corresponding default standard character in the system font library. The terminal may cover the default standard character with the corresponding newly obtained character. In some embodiments, after the default standard character is replaced, the terminal may store the default standard character in a backup storage for future use.

After all the newly obtained characters are added to the system font library as replacement characters, the terminal may use the replacement characters to display the corresponding words on any suitable display interfaces, including the system interface of the terminal or a third party application interface.

In step 314, the terminal receives a first restoring signal.

When the user does not want to use one or more replacement characters, the user may also restore the default system font library. The user may perform a restoring operation on a replacement character that needs to be restored. The terminal then receives a first restoring signal corresponding to the restoration operation.

In one embodiment, a restoration option may be provided in a font-library setting interface of the terminal. The restoration option is unchecked by default. After the user checks the restoration option, the terminal initiates the operation for restoring the system font library. In another embodiment, the user may also use a third-party font-library setting application to restore the font library.

In exemplary embodiments, the user may choose to restore all the characters in the system font library, or only restore one or more designated characters in the system font library.

In step 316, the terminal restores, according to the first restoring signal, a designated character in the system font library to a corresponding default standard character.

In some cases, the user only wants to restore part of the replacement characters in the system character library, and keep the remaining replacement characters unchanged. The user can select the replacement character(s) to be restored from the font-library setting interface or a third-part application.

Based on the user selection, the terminal generates the first restoring signal to restore the character(s) designated by the user to corresponding default standard characters.

After the restoration of the system font library is completed, the designated character(s) are replaced by the corresponding default standard character(s) when the terminal display text on the user interface. The undesignated characters are still used for displaying the text.

Consistent with the disclosed method 300, the terminal acquires an image containing text. The terminal recognizes the text in the image as at least one character, and adds the at least one recognized character to a default system font library. Therefore, the method 300 simplifies the operation of modifying a font and solves the problem that the displayed font can only be modified by manually downloading a font library. For example, to modify a font, the user only needs to photograph a word or a symbol that the user likes to use. Moreover, the method 300 only modifies the font corresponding to the recognized characters, thereby avoiding modifying the fonts of all the characters used by the terminal.

Also, consistent with the disclosed method 300, the terminal selects a region of the image, and recognizes the text in the selected region to obtain the character(s) the user wants to use. In this manner, the method 300 simplifies the font adding operation, and enriches the types of fonts that can be selected by the user.

Moreover, consistent with the disclosed method 300, the terminal recognizes, from the system font library, at least one standard character candidate corresponding to each newly obtained character. This way, the method 300 avoids errors in word recognition, improves the accuracy in replacing the characters, and improves user experience.

Further, consistent with the disclosed method 300, the terminal may only replace the selected characters. Therefore, the method 300 can avoid modifying the fonts of all the characters in the system font library. This way, the method 300 enables the simultaneous display of multiple fonts, thereby satisfying the diverse demands of the users.

In addition, consistent with the disclosed method 300, the terminal may receive a signal for restoring the system font library, and restore the system font library according to the restoring signal. Therefore, the method 300 simplifies the font restoration process and avoids the issue that the user cannot feasibly restore the replacement characters to the default standard characters after losing interest in the replacement characters.

Figure 3B:
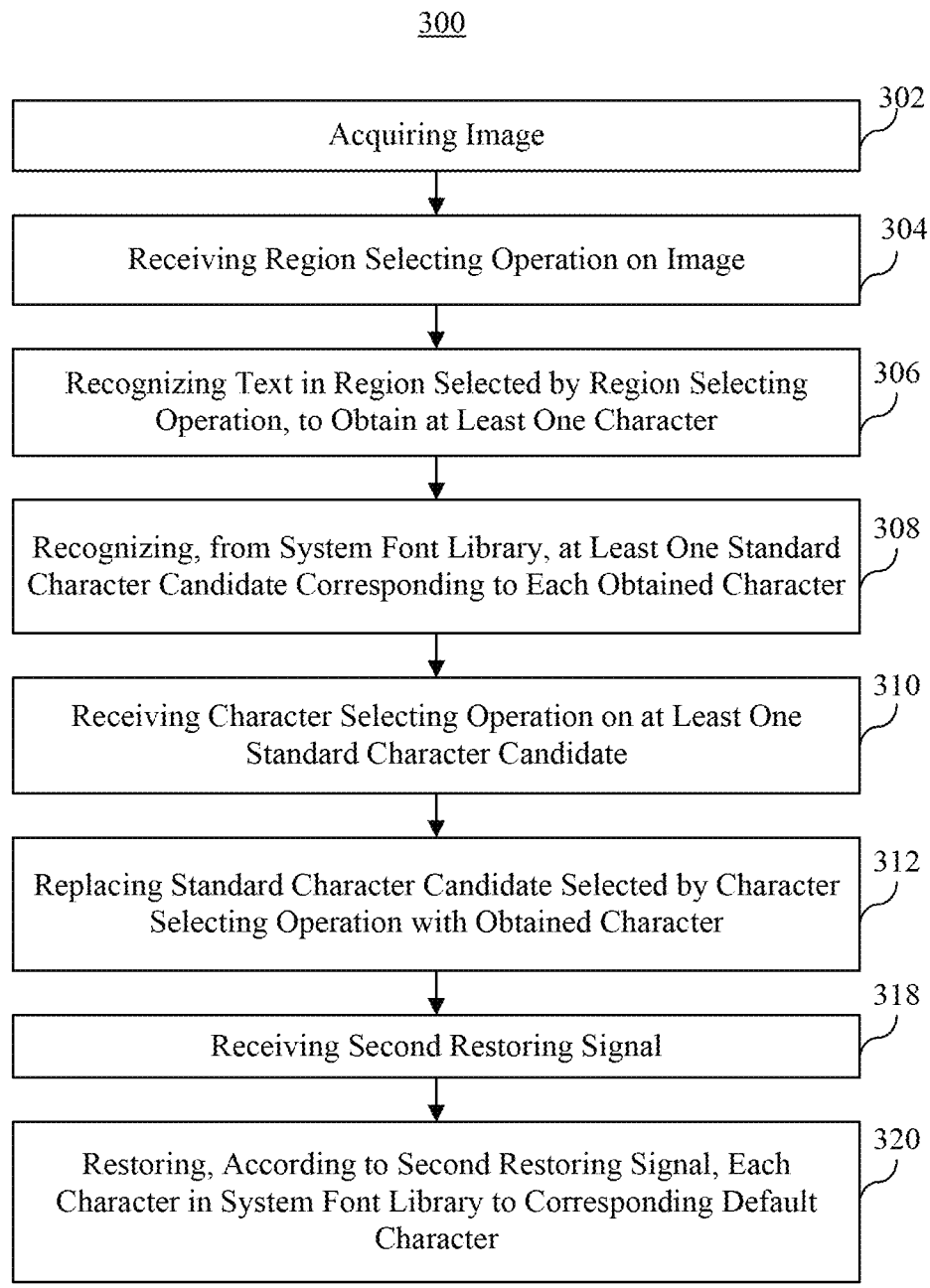
FIG. 3B is a flowchart of a method for adding a font, according to an exemplary embodiment.

In the disclosed embodiments, the user may also choose to restore all the replacement characters to the corresponding default standard characters. FIG. 3B is a flowchart of a method 300 for adding a font, according to another exemplary embodiment. Referring to FIG. 3B, the steps 314 and 316 (FIG. 3A) may be replaced by steps 318 and 320.

In step 318, the terminal receives a second restoring signal.

When the user wants to restore all the replacement characters to the corresponding default standard characters, the user selects a restoring-all option in the font-library setting interface. Based on the selection, a second restoring signal is generated. The terminal then receives the second restoring signal.

In step 320, the terminal restores, according to the second restoring signal, each character in the system font library to a corresponding default standard character.

After all the characters in the system font library are restored, the terminal uses the default standard characters to display all the words or symbols on the user interface.

Figure 4A:
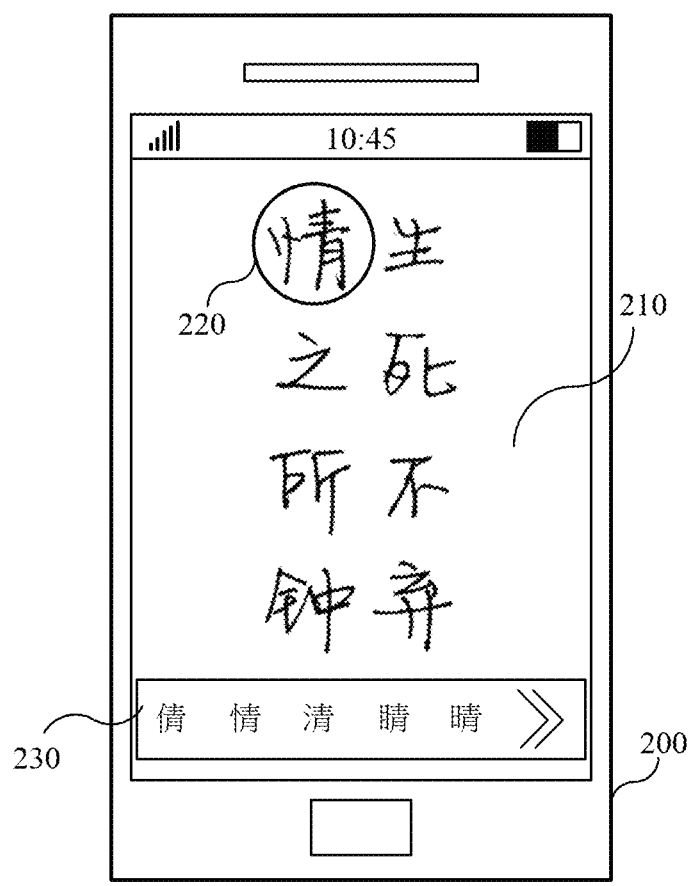
FIG. 4A is a schematic diagram illustrating an implementation of a method for adding a font, according to an exemplary embodiment.
Figure 4B:
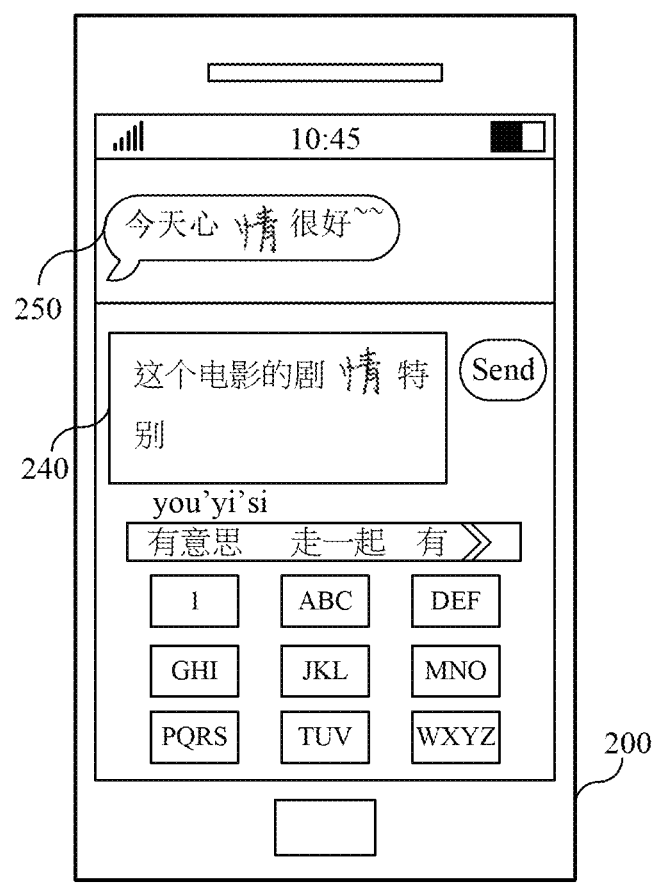
FIG. 4B is a schematic diagram illustrating an implementation of a method for adding a font, according to an exemplary embodiment.
Figure 4C:
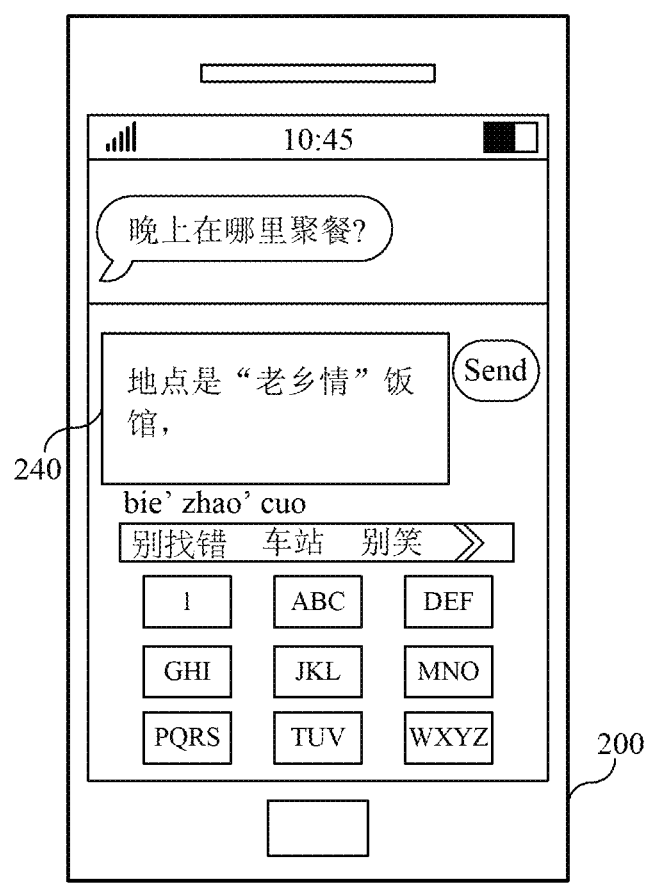
FIG. 4C is a schematic diagram illustrating an implementation of a method for adding a font, according to an exemplary embodiment.

FIGS. 4A-4C are schematic diagrams illustrating an implementation of the method 300 (FIGS. 3A-3B), according to an exemplary embodiment. For example, the terminal in the method 300 may be the smart phone 200. The smart phone 200 is capable of acquiring an image that contains text. In the illustrated embodiment, it is assumed that the text is in Chinese. As shown in FIG. 4A, the user uses the smart phone 200 to acquire the image 210, and wants to add the Chinese character "情" in the image 210 to the system font library. The user displays the image 210 in the font-setting interface, and performs a selecting operation on the region 220 where the character "情" is located. The smart phone 200 recognizes the text in the selected region 220 to obtain the character "情". Moreover, the smart phone 200 recognizes, from the system font library, the standard character candidates corresponding to the recognized character, and displays the recognized standard character candidates in a user interface region 230. As shown in FIG. 4A, the smart phone 200 automatically recognizes the standard character candidates "倩," "情," "请," "睛" and "晴". The user can select "情" as the standard character candidate to be replaced. After the smart phone 200 receives the user operation, the smart phone 200 replaces the default standard character "情" in the system font library with the recognized character "情".

After the recognized character "情" is added into the system font library, the newly added character "情" will be displayed wherever a standard word "情" should otherwise be displayed, including the user interface of the terminal and an interface of a third-party application. As shown in FIG. 4B, in a text-message sending interface of the smart phone 200, the user inputs text in the text input box 240. In the inputted text, the newly added character "情" is displayed at the place where the standard character "情" would otherwise be displayed. In a historical message record 250, the word "情" is also displayed in the newly added character "情".

After the user uses the newly added character "情" for a certain period, the user may get tired of the newly added character. In this case, the user can select the newly added character "情" in the system settings of the smart phone 200, and restore the newly added character "情" to the corresponding default standard character, which is saved in a backup storage. As shown in FIG. 4C, after the user restores the system font library, the word "情" in the text inputted to the text input box 240 is no longer displayed in the newly added character "情", but as the default standard character "情."

The following are embodiments about devices consistent with the present disclosure, which can be configured to perform the method embodiments of the present disclosure. For details that are not described in the device embodiments, reference can be made to the method embodiments.

Figure 5:
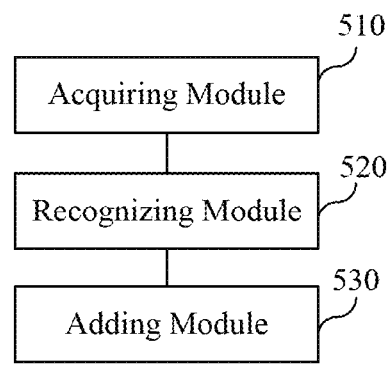
FIG. 5 is a block diagram of a device for adding a font, according to an exemplary embodiment.

FIG. 5 is a block diagram of a device 500 for adding a font, according to an exemplary embodiment. For example, the device 500 may be implemented as part or whole of a terminal by means of hardware, software, or a combination of software and hardware. As shown in FIG. 5, the device 500 includes an acquiring module 510, a recognizing module 520, and an adding module 530.

The acquiring module 510 is configured to acquire an image.

The recognizing module 520 is configured to recognize text in the image as at least one character. Each character is a font file corresponding to a single word or a single symbol.

The adding module 530 is configured to add a recognized character to a default system font library. The default system font library includes characters used by the terminal for displaying text on a user interface of the terminal.

Figure 6:
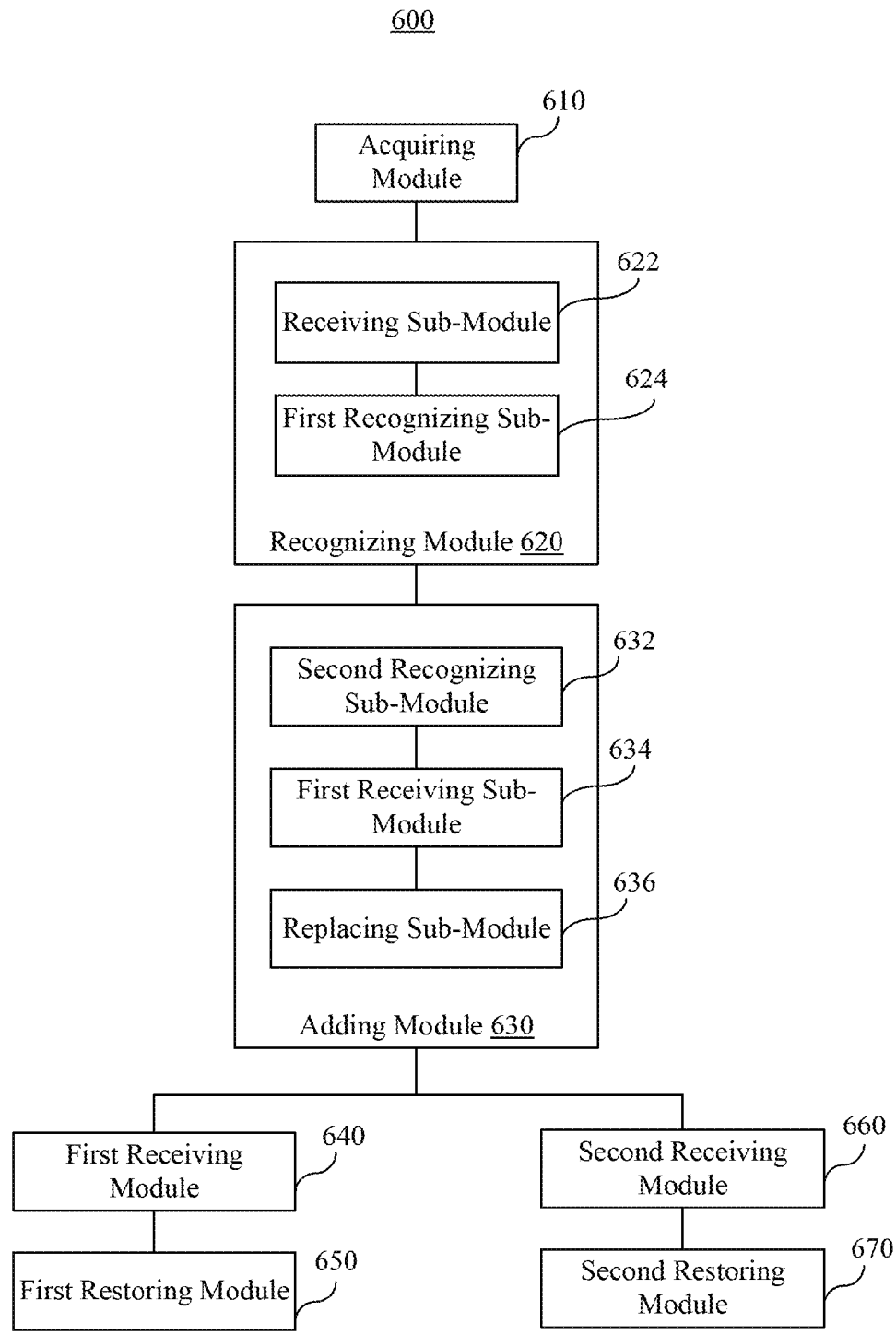
FIG. 6 is a block diagram of a device for adding a font, according to an exemplary embodiment.

FIG. 6 is a block diagram of a device 600 for adding a font, according to an exemplary embodiment. For example, the device 600 may form part or whole of a terminal by means of hardware, software, or a combination of software and hardware. As shown in FIG. 6, the device 600 includes an acquiring module 610, a recognizing module 620, and an adding module 630, similar to the acquiring module 510, the recognizing module 520, and the adding module 530, respectively (FIG. 5).

In some embodiments, the recognizing module 620 may further include a receiving sub-module 622 and a first recognizing sub-module 624. The receiving sub-module 622 is configured to receive a region selecting operation on the image. The first recognizing sub-module 624 is configured to recognize text in the region selected by the region selecting operation, to obtain at least one character.

In some embodiments, the adding module 630 may further include a second recognizing sub-module 632, a first receiving sub-module 634, and a replacing sub-module 636. The second recognizing sub-module 632 is configured to recognize, from the system font library, at least one standard character candidate corresponding to a character recognized by recognizing module 620. The first receiving sub-module 634 is configured to receive a character selecting operation on the at least one standard character candidate. The replacing sub-module 636 is configured to replace, in the system font library, a standard character candidate selected by the word selecting operation with the recognized character.

In some embodiments, the device 600 may further include a first receiving module 640 and a first restoring module 650. The first receiving module 640 is configured to receive a first restoring signal. The first restoring module 650 is configured to restore, according to the first restoring signal, a designated character in the system font library to a corresponding default standard character.

In some embodiments, the device 600 may further include a second receiving module 660 and a second restoring module 670. The second receiving module 660 is configured to receive a second restoring signal. The second restoring module 670 is configured to restore, according to the second restoring signal, each character in the system font library to a corresponding default standard character.

With respect to the devices in the above embodiments, the specific manners for performing operations by the individual modules therein have been described in detail in the embodiments regarding the relevant methods, which will not be elaborated herein.

Figure 7:
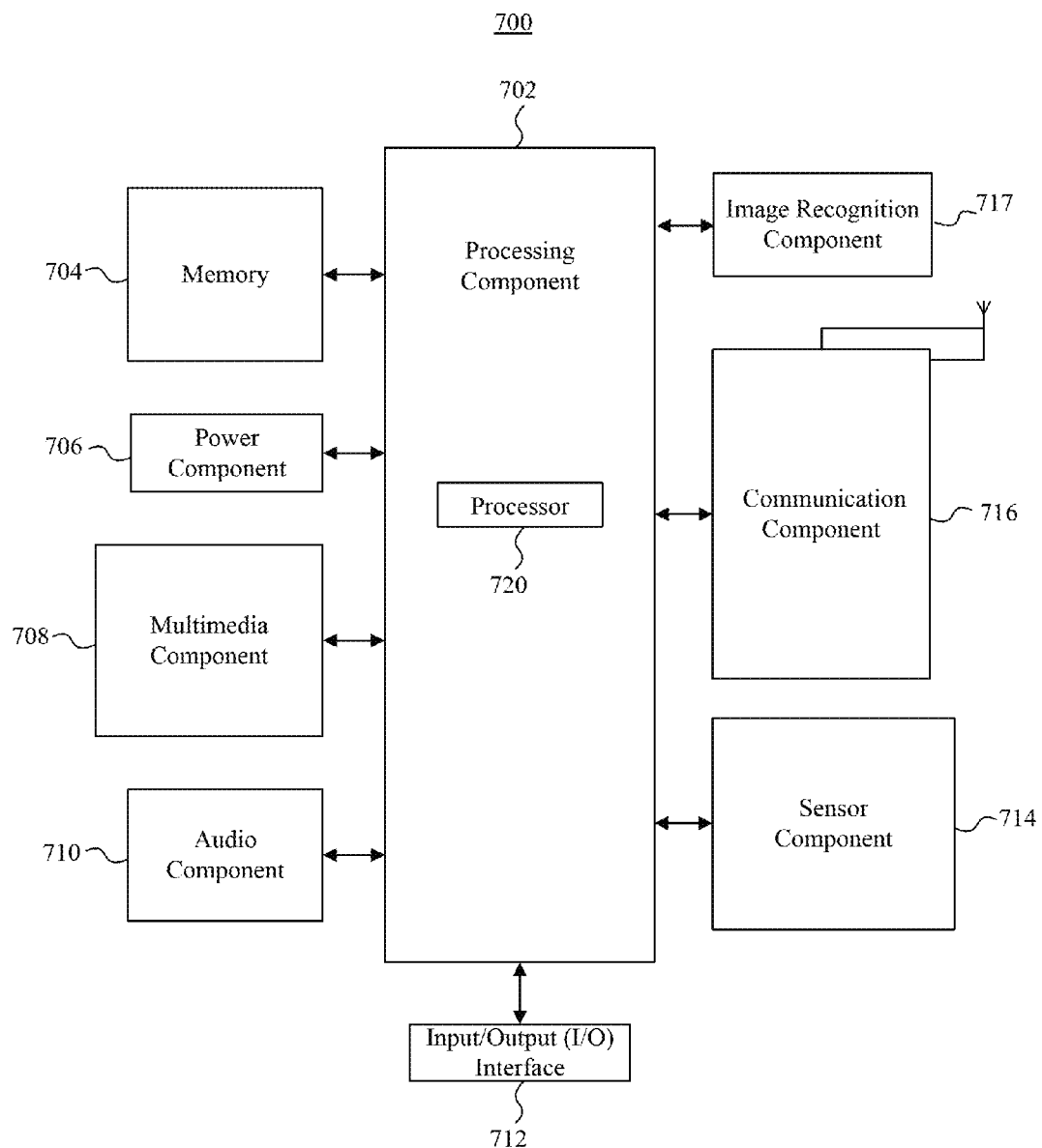
FIG. 7 is a block diagram of a device for adding a font, according to an exemplary embodiment.

FIG. 7 is a block diagram of a device 700 for adding a font, according to an exemplary embodiment. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, a communication component 716, and an image recognition component 717.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2G, 3G, 4G, or a combination thereof. In one exemplary embodiment, the communication component 716 receives a broadcast signal or broadcast associated information from an external broadcast management system via a broadcast channel In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The image recognition component 717 is configured to perform image functions consistent with the functions of the recognizing models 520 (FIG. 5) and 620 (FIG. 6).

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method for adding a font.

In exemplary embodiments, there is also provided a non-transitory computer-readable storage medium including instructions, such as included in the memory 704, executable by the processor 720 in the device 700, for performing the above method for adding a font. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method performed by a terminal, comprising:
   acquiring an image;
   recognizing text in the image as at least one character, each character being a font file corresponding to a single word or a single symbol; and
   adding a recognized character to a system font library, the system font library including characters used for displaying text on a user interface,
   wherein the adding of the recognized character to the system font library comprises:

recognizing, from the system font library, at least one standard character candidate corresponding to the recognized character;

receiving a character selecting operation on the at least one standard character candidate, the character selecting operation selecting a standard character candidate, the selected standard character candidate and the recognized having different fonts; and replacing, in the system font library, the selected standard character candidate with the recognized character.

2. The method of claim 1, wherein the recognizing of the text in the image as the at least one character comprises:

receiving a region selecting operation on the image, the region selecting operation selecting a region of the image; and recognizing the text in the selected region to obtain the at least one character.

3. The method of claim 1, further comprising:

receiving a first restoring signal designating a character in the system font library; and restoring, according to the first restoring signal, the designated character in the system font library to a corresponding default standard character.

4. The method of claim 1, further comprising:

receiving a second restoring signal; and restoring, according to the second restoring signal, each character in the system font library to a corresponding default standard character.

5. A device for adding a font, comprising:

a processor; and a memory for storing instructions executable by the processor;

wherein the processor is configured to perform:

acquiring an image;

recognizing text in the image as at least one character, each character being a font file corresponding to a single word or a single symbol; and adding a recognized character to a system font library, the system font library including characters used for displaying text on a user interface, and wherein in adding the recognized character to the system font library, the processor is further configured to perform:

recognizing, from the system font library, at least one standard character candidate corresponding to the recognized character;

receiving a character selecting operation on the at least one standard character candidate, the character selecting operation selecting a standard character candidate, the selected standard character candidate and the recognized having different fonts; and replacing, in the system font library, the selected standard character candidate with the recognized character.

6. The device of claim 5, wherein the processor is further configured to perform:

receiving a region selecting operation on the image, the region selecting operation selecting a region of the image; and recognizing the text in the selected region to obtain the at least one character.

7. The device of claim 5, wherein the processor is further configured to perform:

receiving a first restoring signal designating a character in the system font library; and restoring, according to the first restoring signal, the designated character in the system font library to a corresponding default standard character.

8. The device of claim 5, wherein the processor is further configured to perform:

receiving a second restoring signal; and restoring, according to the second restoring signal, each character in the system font library to a corresponding default standard character.

9. A non-transitory computer-readable storage medium storing instructions that, when executed by a processor of a device, cause the device to perform a method for adding a font, the method comprising:

acquiring an image;

recognizing text in the image as at least one character, each character being a font file corresponding to a single word or a single symbol; and adding a recognized character to a system font library, the system font library including characters used for displaying text on a user interface, wherein the adding of the recognized character to the system font library comprises:

recognizing, from the system font library, at least one standard character candidate corresponding to the recognized character;

receiving a character selecting operation on the at least one standard character candidate, the character selecting operation selecting a standard character candidate, the selected standard character candidate and the recognized having different fonts; and replacing, in the system font library, the selected standard character candidate with the recognized character.

10. The medium of claim 9, wherein the recognizing of the text in the image as the at least one character comprises:

receiving a region selecting operation on the image, the region selecting operation selecting a region of the image; and recognizing the text in the selected region to obtain the at least one character.

11. The medium of claim 9, wherein the method further comprises:

receiving a first restoring signal designating a character in the system font library; and restoring, according to the first restoring signal, the designated character in the system font library to a corresponding default standard character.

12. The medium of claim 9, wherein the method further comprises:

receiving a second restoring signal; and restoring, according to the second restoring signal, each character in the system font library to a corresponding default standard character.

* * * * *